(No Model.)

H. J. HOUSE.
BURNISHING MACHINE.

No. 353,633. Patented Nov. 30, 1886.

WITNESSES

INVENTOR
Henry J. House
By his Attorneys
Potts and Richter.

UNITED STATES PATENT OFFICE.

HENRY J. HOUSE, OF CAMDEN, NEW JERSEY.

BURNISHING-MACHINE.

SPECIFICATION forming part of Letters Patent No. 353,633, dated November 30, 1886.

Application filed April 21, 1886. Serial No. 199,589. (No model.)

*To all whom it may concern:*

Be it known that I, HENRY J. HOUSE, a citizen of the United States, residing in the city and county of Camden and State of New Jersey, have invented a new and useful Burnishing-Machine, of which the following is a specification.

My invention relates to means for burnishing bronze on composition ornaments, &c.

The composition is a mixture of rosin, whiting, boiled linseed-oil, and glue, which, when dry, forms a very hard substance. The ornaments are made of this composition by pressing it into molds while warm. They are then mounted upon picture-frames, room-moldings, cornices, &c., the surfaces of which, also the ornaments, are bronzed with bronze-powder. The work is then ready for the burnisher. The object of the burnisher is to burnish, not the ornaments, but the bronze upon them.

The object of my invention is to produce a machine that will allow this work to be done with equal exactness and with much greater rapidity than by the tools now in common use for the same purpose, which have but one point, thus saving time and expense. The implement is operated by shoving with the hand or by machinery back and forth over and along the surface of the material to be burnished. I attain these objects by the mechanism illustrated in the accompanying drawings, in which—

Figure 1:
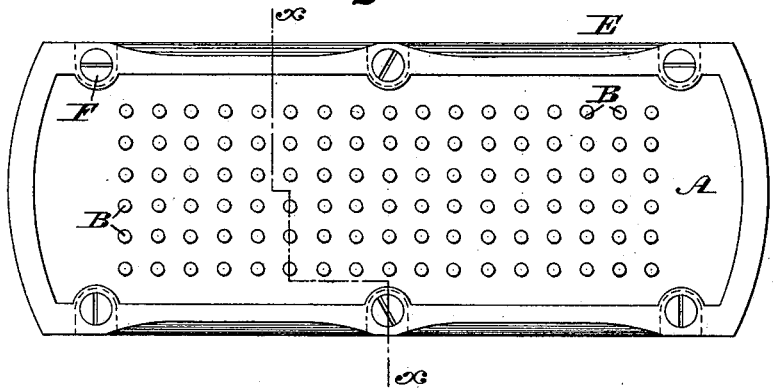
Figure 2:
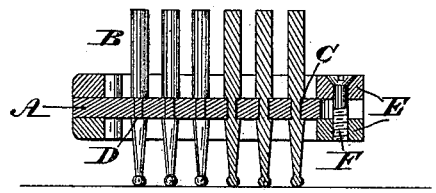
Figure 3:

Figure 1 is a plan or top view of the machine. Fig. 2 is a section taken in the line *x x*, Fig. 1. Fig. 3 is a modification.

Similar letters of reference indicate like parts in the several figures.

The machine consists of a cushion, A, made of rubber, leather, cloth, or other material, into which are inserted points B made of steel or other substance, having grooves C cut all around about midway their length, thus forming flanges or shoulders D, intended to prevent them working out of place. The cushion is held firmly by a frame, E, clasping its edges all around, and fastened together with screws F.

The modification consists of a cushion, A, the same as in the machine above described, into which are inserted their full length the points B, having heads or shoulders G on the upper ends to prevent them dropping through the cushion. Over these heads and on top of the cushion is placed a piece of leather, H, fastened at both ends of the cushion, upon which the hand rests when in use, thus preventing the points working up through the cushion. Being made flexible, it can be bent in any shape, and is intended to be used on odd, square, and joined frame-work, inside corners, &c., where it would be difficult to use the regular machine of Fig. 1 on account of the frame.

It is evident that many slight changes may be made in the details of construction and arrangement of parts without departing from the spirit of my invention, and hence I do not limit myself to the exact construction shown and described; but

What I claim as new, and desire to secure by Letters Patent, is—

A burnishing-implement comprising a flexible body and a series of hard points secured thereto, for the purpose set forth.

HENRY J. HOUSE.

Witnesses:
JOHN J. CRANDALL,
I. EUGENE TROTH.